INVENTOR.
JACK "E" WILCOX

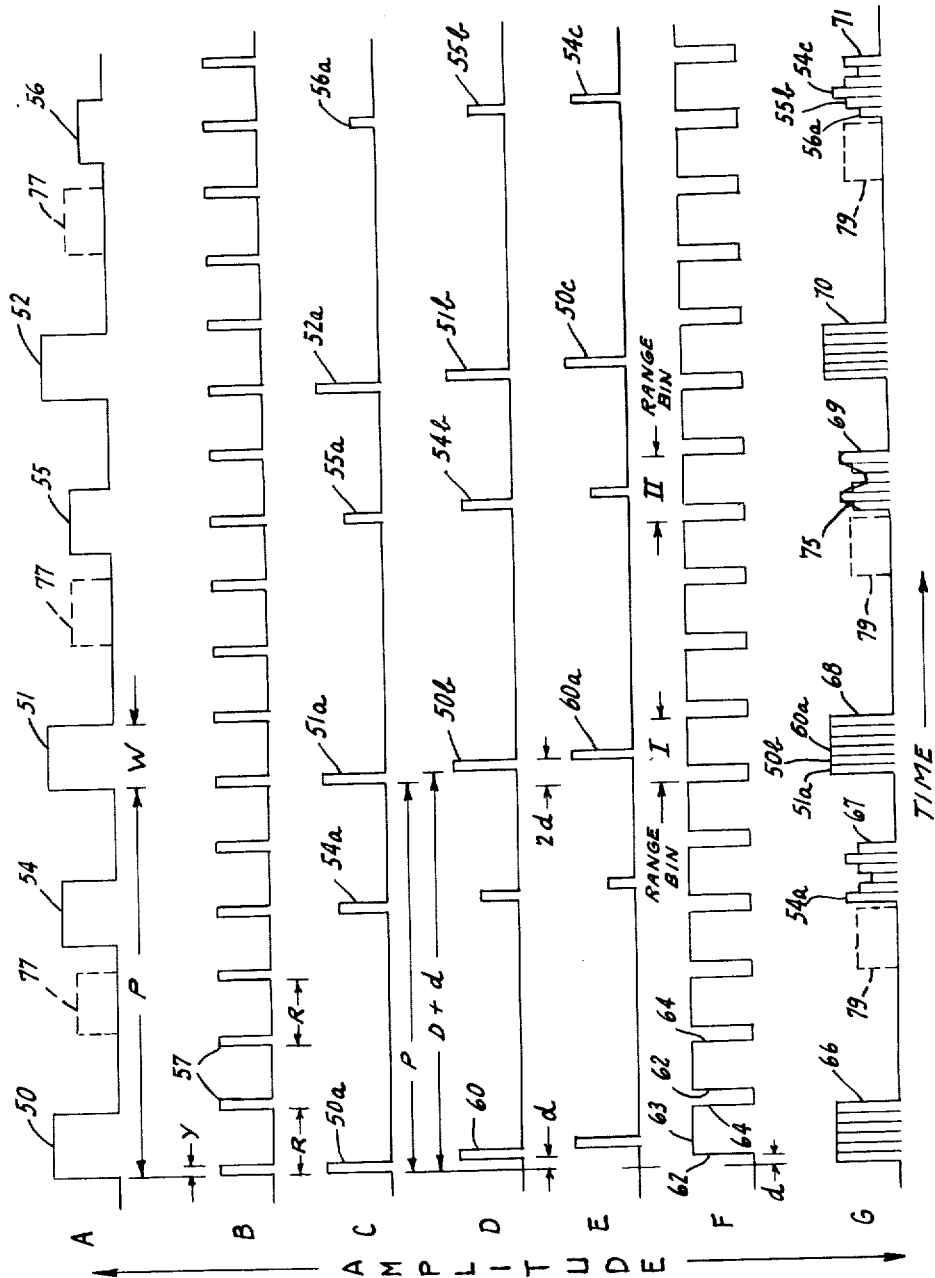

June 7, 1966 J. "E" WILCOX 3,255,341
SAMPLED REENTRANT DATA PROCESSING SYSTEM
Filed Nov. 23, 1959 3 Sheets-Sheet 3
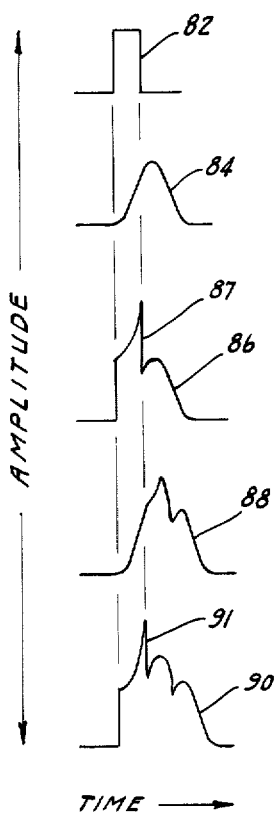
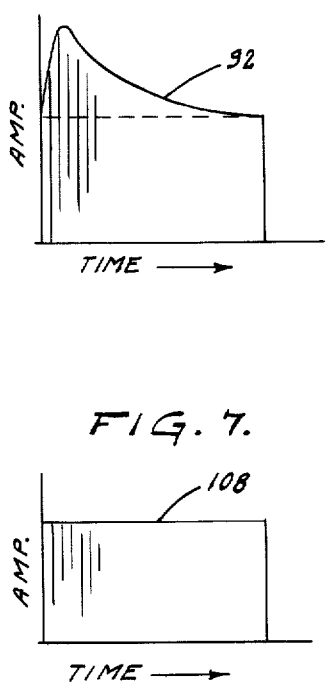
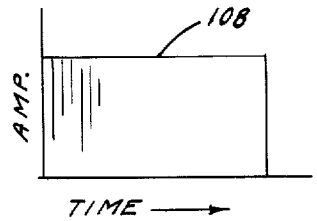
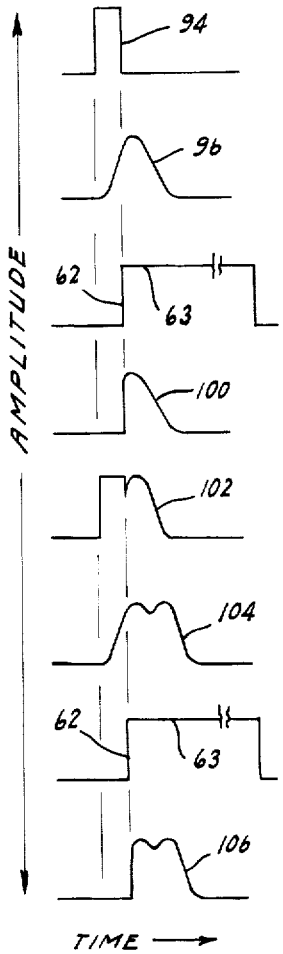
INVENTOR.
JACK "E" WILCOX
BY
Robert D. Sanborn
ATTORNEY United States Patent Office 3,255,341
Patented June 7, 1966

3,255,341
SAMPLED REENTRANT DATA PROCESSING
SYSTEM
Jack "E" Wilcox, Levittown, Pa., assignor, by mesne assignments, to Philco Corporation, Philadelphia, Pa., a corporation of Delaware
Filed Nov. 23, 1959, Ser. No. 854,980
9 Claims. (Cl. 235—165)

The present invention relates to data processing systems and more particularly to improvements in sampled re-entrant data processing systems.

Sampled re-entrant data processing systems are employed in the radar art for collecting and collating successive echo signals returned by a selected target. The sampled re-entrant data processing system separates the target echo signals received from each target from intervening target echo signals and other signals which may be present in the output of a radar receiver and presents a selected number of successive target echo signals from each target in time sequence on a compressed time scale. In a typical system of this type, the video signal supplied by the radar receiver is sampled at a multiple of the radar pulse repetition frequency. The repetition period of the sampling pulses is preferably made equal to or slightly less than the time duration, that is, pulse width of the transmitted pulse. The sampling pulse has a time duration, i.e., pulse-width which is small compared with the pulse-width of the radar system. The time samples of the video signal are supplied to the input of a delay line. The delay time of this delay line differs from the pulse repetition period of the radar system by approximately the width of the sampling pulse. The output of the delay line is connected back to the input thereof so that signals once introduced into the delay line are continually recirculated therethrough until removed by momentarily opening the loop or by some other means. As will be shown in more detail presently, this has the effect of causing samples which are spaced apart by the pulse repetition period in the original radar video signal to occur in time succession in the output of the re-entrant data processor. Thus samples of successive radar returns from a single target in space which are spaced apart in time at the output of the radar receiver by the radar pulse repetition period, and which may be interspersed with other signals representing other targets at different ranges, appear in rapid time sequence and free of interspersed signals at the output of the sampled re-entrant data processor. This has the effect of compressing the time scale on which samples of successive signals from a given target occur. This compression of the time scale and the elimination of intervening signals from other targets permits the use of relatively simple circuits to extract information such as information relating to movement of the target from the assembled samples of the received radar signal.

In a sampled re-entrant data processing system which does not employ signal shaping circuits in the signal loop, the number of successive target signals that can be assembled in a time sequence is limited. Each time a pulse passes through a circuit of finite bandwidth, such as the delay line of the signal loop, it undergoes a slight time spread. This time spread causes each sample pulse to overlap the adjacent sample pulse. As will be shown in more detail presently, this overlapping leads to a distortion of the relative amplitudes of the stored target echo signals. A characteristic known as cross-talk ratio is employed as a measure of the undesirable distortion introduced by the spreading of each pulse as it passes through circuits of limited bandwidth. The cross-talk ratio of a sampled re-entrant data processor is defined as the ratio of the amplitude of the skirt portion of a first pulse measured at the time of occurrence of the maximum value of the following pulse, to the original amplitude of the first pulse.

The distortion present in the output signal of a sampled re-entrant data processor increases as the number of stored sample signals increases. This distortion has been recognized by other workers in the art and attempts have been made to minimize the distortion by increasing the bandwidth of the loop, increasing the interpulse period of the sampling pulses, and/or reshaping each stored pulse after each passage through the loop. It can be shown that the required bandwidth of a sampled re-entrant data processing system is inversely proportional to the spacing between sample pulses and, for constant spacing, increases as the number of pulse circulations increase. Assuming an acceptable cross-talk ratio to be —40 db, a system having a sampling pulse period of 0.2 microsecond and 40 circulations of the signal would require a 30 megacycle bandwidth. It is difficult to obtain a bandwidth of this magnitude in sampled re-entrant data processing systems which require solid delay lines to give the necessary loop delay.

Reshaping each pulse after each passage through the loop reduces the required bandwidth of the loop by a factor of three or four. However, the circuitry necessary to reshape the individual pulses greatly increases the complexity of the data processing system.

Therefore it is an object of the present invention to provide a sampled re-entrant data processing system which does not require reshaping of the individual recirculating signals.

Still another object of the present invention is to provide a sampled re-entrant data processing system which requires only a relatively narrow bandwidth in the recirculating loop.

An additional object of the present invention is to provide a sampled re-entrant data processing system which will operate satisfactorily with a bandwidth less than that required by presently known pulse regeneration or pulse reshaping data processing systems of comparable pulse spacing.

A further object of the present invention is to provide a sampled re-entrant data processing system which is suitable for use in time-multiplex communication systems or the like.

In general these and other objects of the present invention are achieved by providing a sampled re-entrant data processing system which includes means for shaping only that time portion of the composite recirculating signal waveform to which data is to be added prior to the addition of new data.

For a better understanding of the present invention together with other and further objects thereof, reference should now be made to the following detailed description which is to be read in conjunction with the accompanying drawings in which:

FIG. 2 is a series of waveforms which illustrate the operation of a sampled re-entrant data processing system;

FIGS. 4 and 5 are amplitude versus time plots which illustrate the effect of cross-talk in a conventional sampled re-entrant data processing system; and FIGS. 6 and 7 are amplitude versus time plots which illustrate the operation of the present invention.

Figure 1:
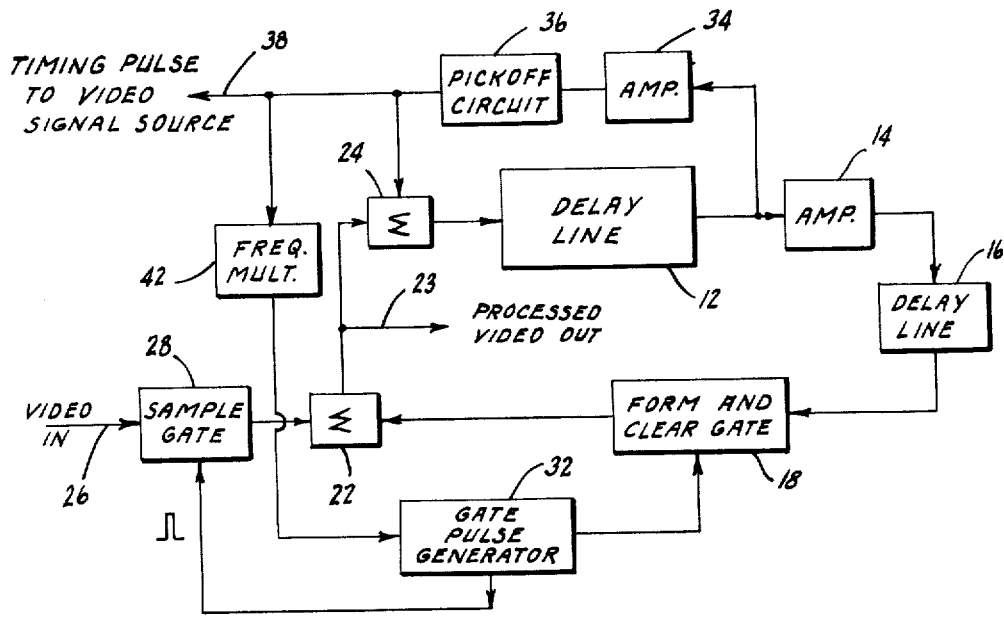
FIG. 1 is a block diagram of one preferred embodiment of the present invention.

In FIG. 1, the sampled re-entrant data processing loop comprises a delay line 12 which may be a solid delay line formed of quartz or similar material. If the signal to be processed is periodic in nature, the delay line 12 preferably has a delay time which is substantially equal to the information recurrence period of the signal to be processed. In a typical system, delay line 12 may have a delay time of 333 microseconds. Signals at the output of delay line 12 are supplied by way of amplifier 14 to a second delay line 16. Delay line 16 provides a delay time equal to or slightly greater than the width of the video sample pulses which are supplied to the loop. In a typical system delay line 16 may have a delay of the order of 0.1 to 0.3 microsecond. The output of delay line 16 is supplied through a gate 18 to one input of an adder network 22. The output of adder network 22 is connected through a second adder network 24 to the input of delay line 12. As will be explained in more detail presently, adder network 24 is employed to combine timing signals and the video signals for passage through the delay line 12. The presence of these timing signals does not affect the overall operation of the signal loop.

The signal to be processed is supplied to input connection 26. Input connection 26 is coupled to an input of the adder network 22 through a sampling gate 28. Gate circuits 18 and 28 are controlled by signals supplied by gate pulse generator 32. The nature of the gate signals supplied by generator 32 will be described in more detail presently. A processed output signal may be taken from any convenient point in the signal loop. An output connection 23 at the output of adder 22 is shown by way of example.

As mentioned above, if periodic signals are to be processed, it is necessary that the delay time of delay line 12 bear a fixed relationship to the repetition period of the periodic signals supplied to input 26. For example, if the signals supplied to input 26 are derived from a radar receiver, it is necessary that the delay time of delay line 12 bear a fixed relationship to the pulse repetition period of the radar system. This can be accomplished by forming a timing loop in which delay line 12 controls the periodicity of the timing pulses supplied to the radar system.

The timing loop of FIG. 1 comprises delay line 12, an amplifier 34, a pick-off circuit 36 and adder 24. The timing pulses in the timing loop have an amplitude which is greater than the amplitude of the video sample signals circulating in the signal processing loop. Pick-off circuit 36 blocks the lower amplitude video sample signals and passes only the higher amplitude timing pulses. Timing loops of this kind are well known in the radar art and will not be further described.

The output of the timing loop is supplied by way of output connection 38 to the source which generates the video signals to be processed. If this source is a radar system, the output connection 38 may be connected to the radar transmitter. The output of the timing loop is also supplied to a frequency multiplier 42 which provides synchronizing signals to gate pulse generator 32.

The operation of the system of FIG. 1 will now be explained with reference to the waveforms A to G of FIG. 2. The assumption will be continued that the signals to be processed are received from a radar system but it should be kept in mind that the system of FIG. 1 will process any video signal which has correlated intelligence at intervals spaced apart in time by the delay time of delay line 12. The system may also be employed in time multiplex transmission systems to collect successive time samples of signals such as audio frequency voice signals, television signals, etc. which are not periodic in nature. In the initial explanation of the system of FIG. 1, it will be assumed that the signal processing loop has infinite bandwidth so that the circulating pulses retain their idealized rectangular shape.

Waveform A in FIG. 2 represents the video signal received at input 26 from the second detector of a radar system. Pulses 50, 51 and 52 represent the energy passing directly to the receiver in response to three successive pulses transmitted by the radar system. Pulses 54, 55 and 56 at A in FIG. 2 represent successively received target echo signals returned from a single moving target in space. The fact that the target is in motion is indicated by the variation in the amplitudes of the successively received pulses 54, 55 and 56. The widths of the pulses 51–52 and 54–56 have been greatly exaggerated with respect to the pulse repetition period in order to show more clearly the time relationships of the sample pulses in waveforms B to G. In a typical radar system the repetition period P between pulses 50 and 51, for example, may be of the order of 300 to 2,000 microseconds. In this example the delay time D of delay line 12 and the repetition period P of pulses 50–52 is assumed to be 333 microseconds. The pulses 50–52 may have a time duration W of one microsecond although pulse widths from a fraction of a microsecond to a few microseconds may be employed.

Sample gate 28 in FIG. 1 passes signals supplied thereto only when supplied with a sampling pulse from gate pulse generator 32. Waveform B of FIG. 2 represents the sampling gate pulses supplied by gate pulse generator 32 to sampler 28. The gate pulses 57 in waveform B recur at a multiple of the pulse repetition frequency of the pulses of waveform A. Preferably the repetition period R of these sampling pulses 57 is selected to be equal to or less than pulse width W of the radar system so that all received echo signals are sampled at least one per repetition period P.

In the example chosen for illustration in FIG. 2, the gate pulses 57 of FIG. 2B have a repetition frequency which is six times the repetition frequency of pulses 50, 51 and 52 of FIG. 2A. The time width Y of the gate pulses is made equal to or less than the pulse repetition period R of the gate pulses 57 divided by the number N of sample pulses from each target that is to be stored at one time. That is, $Y = R/N$.

Waveform C of FIG. 2 represents the output signal of sample gate 28. Pulses $50a$–$52a$ and $54a$–$56a$ correspond in amplitude to pulses 50–52 and 54–56, respectively, of waveform A. They correspond in time to gate pulses 57. The signals represented by pulses $50a$–$52a$ and $54a$–$56a$ are injected into the re-entrant processing loop by adder 22.

As mentioned above, delay line 12 has a delay D equal to the pulse repetition period P of pulses 50–51. Delay line 16 has a delay time $d$ equal to or slightly greater than the width Y of the sampling pulses. It is assumed that the other elements of the loop introduce no delay. The minor delays which may be introduced by the additional elements of the loop may be subtracted from the delay provided by delay line 16 in order that the total loop delay is equal to $D+d$ as shown in FIG. 2. For brevity in the claims the expression $D+d$ is replaced by S. Therefore, if gate circuit 18 is conditioned to pass signals, the signals represented by pulses $50a$–$52a$ and $54a$–$56a$ will reappear at the output of this gate circuit 18 after a delay of $D+d$ seconds. These delayed signals are partially represented by the pulses $50b$, $51b$, $54b$ and $55b$ in waveform D. The delayed signals corresponding to pulses $52a$ and $56a$ are off the time scale of FIG. 2.

The output of sample gate 28 is combined in adder 22 with signals already circulating in the loop. Pulse 60 of waveform D of FIG. 2 represents a sample of the transmitted pulse which occurred just priod to pulse 50.

Waveform 2E represents the signals of waveform D of FIG. 2 after an additional passage around the loop. Thus, pulse $60a$ of waveform E represents the pulse 60 after it has made two trips around the loop and hence has been delayed by a time $(2D+2d)$ or $2d$ from the reference time represented by pulse 51 of FIG. 2A.

Figure 3:
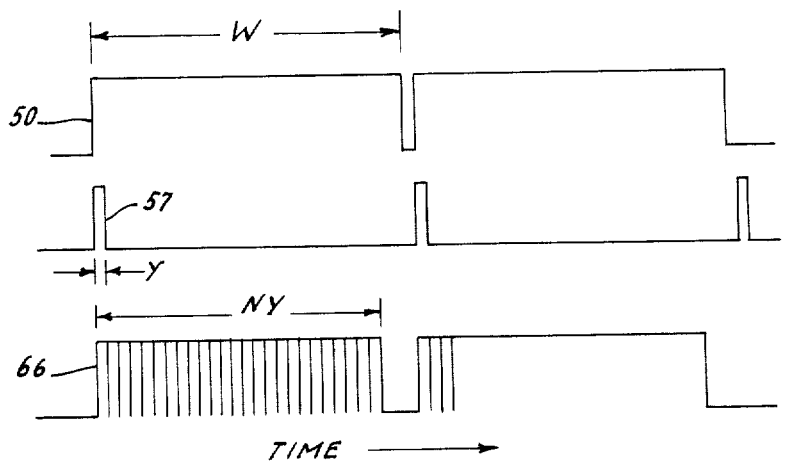
FIG. 3 is a second series of waveforms on an expanded time scale which further illustrate the operation of a sampled re-entrant data processing system.

The processed video signal appearing at the output of adder 22 is the summation of the pulse trains shown in waveforms 2C, 2D, and 2E plus other similar pulse trains resulting from the introduction of further data at input 26 and the continued circulation of the composite signal around the loop. FIG. 3 represents on an expanded scale the ideal composite pulse 66 which would result from sampling N successive constant amplitude pulses 50 by means of sampling pulses 57.

A comparison of FIGS. 2C, 2D and 2E will show that the samples of successively transmitted pulses all fall within a "range bin" I which occupies a position in time between two successive sampling pulses 57. Similarly, samples of successive echo signals from the selected target in space fall within a second "range bin" II between two different sampling pulses 57. These two "range bins" are spaced apart in time by approximately the spacing of pulses 50 and 54, for example, in waveform 2A.

In the explanation so far, it has been assumed that the signals in the re-entrant processing loop pass without hinderance through gate 18. The gate pulse signal supplied to gate 18 from gate pulse generator 32 is shown in waveform F of FIG. 2. The leading edge 62 of the positive-going enabling pulses 63 of waveform F occur at a time $d$ after the leading edge of the sampling pulses 57. The trailing edges 64 of the enabling pulses of waveform F occur not later than, and preferably slightly earlier than, the leading edge of the following sampling pulse 57. Thus the pulses introduced into the signal processing loop by adder 22 can continue to circulate around the loop until the cumulation of the incremental delays imparted by delay line 16 causes the recirculating signal to be in time coincidence with the next occurring sampling pulse 57. The oldest stored data in each "range bin"—that is, the delayed signal coresponding in time to a sampling pulse 57—is dropped each repetition period P of the transmitted pulse and fresh data is inserted in its place. This change of data in each "range bin" can be visualized by assuming that a given signal enters a "range bin" at one point in time, progresses across the "range bin" on successive circulations around the loop and finally exits from the "range bin" on the opposite side from which it entered. It is to be understood that the concept of separate "range bins" is introduced solely as an aid in visualizing the operation of the circuit. There is no separation of the signals in the signal loop except for their time separation described above. It should now be clear that a composite pulse representing several successively transmitted pulses, and a second composite pulse representing samples of several successively received target echo signals, appear at the output of adder 22 once each pulse repetition period.

Waveform G of FIG. 2 illustrates the change in the composite pulses 66–71 from one repetition period to the next. The pulses 66, 68 and 70 represent the transmitted pulses. These composite pulses do not change since the amplitudes of the sucessively transmitted pulses remain constant. Pulses 67, 69 and 71 are composite pulses made up of samples of successively received echo signals received from the target being tracked by the radar system. Successive echo signals may change in amplitude due to target motion with respect to the radar system. Since the position of a given sample progresses across the composite signal representating a target on sucessive circulations of the signal, the phase of the amplitude modulation component 75 of the composite pulses 67, 69 and 71 will change on successive occurrences of the composite pulse at the output of adder 22.

Only one target echo signal per transmitted pulse has been assumed in order to simplify the explanation of the system. It should be understood, however, that two or more target echo signals occurring in a given repetition period P will be processed in the same way. For example, a series of target echo signals spaced from the transmitted pulses as shown at 77 in waveform A will result in a series of component signals as shown at 79 in waveform G.

Up to this point it has been assumed that the individual sample pulses undergo no distortion in circulating the loop. However, to achieve this condition in practice would require an infinite bandwidth in the signal loop. The finite bandwidth of an actual sampled re-entrant data processing system results in a spreading of the sample pulse on each circulation around the loop. In prior art systems this spreading of the sample pulse introduced serious distortion in the composite signal. I have discovered that the distortion of the composite signal due to the spreading of the pulses in the signal loop results primarily from the direct addition of new sample pulses to the distorted sample pulses as shown in FIG. 4. I have discovered also that spreading of the sample pulses on the second and subsequent passages around the signal loop introduces little, if any, distortion in the composite signal. This is believed to be due to the high degree of correlation between adjacent sample signals in the composite signal. FIGS. 4 and 5 illustrate the distortion introduced by prior art sampled re-entrant data processing systems of limited bandwidth. FIGS. 6 and 7 illustrate the greatly improved results achieved by the present invention.

Pulse 82 in FIG. 4 represents a sample pulse supplied to adder 22 from sample gate 28. Pulse 84 of FIG. 4 represents the same sample pulse after one passage around a signal loop of limited bandwidth. In prior art data processing systems which do not include pulse reshaping circuits, the distorted pulse 84 is added directly to the next sample pulse which again has the shape of pulse 82 of FIG. 4. Pulse 86 of FIG. 4 represents the addition of pulse 84 to a second sample pulse similar to pulse 82 occurring one repetition period later in time. It should be noted that the composite pulse 86 has a spike 87 thereon which results from the addition of the new sample pulse to the skirt of pulse 84. Pulse 88 represents the pulse 86 after one passage around the limited bandwidth signal loop. It will be seen that the skirt on the leading edge of pulse 88 has a higher amplitude than the skirt on pulse 84 due to the spike 87 which is present on pulse 86. Pulse 90 of FIG. 4 represents the addition of a third pulse similar to pulse 82 to the composite pulse 88. Spike 91 on pulse 90 is higher than spike 87 on pulse 86. The envelope of a composite pulse obtained by adding a large number of sample pulses, for example 30 sample pulses, in the manner just described is shown in FIG. 5. The distorted waveform of FIG. 5 should be compared with the idealized waveform shown at 66 in FIG. 3. The distortion of the envelope of pulse 92 may mask any amplitude modulation components which appear on the composite signal as a result of the variations in amplitude of the individual sample signals.

As mentioned above, previous attempts to minimize the distortion of the envelope of composite pulse 92 have been directed along the lines of increasing the bandwidth of the signal loop so that there is less spreading of the pulse 84 on each circulation. Alternatively, fewer sampling pulses are employed so that there is an appreciable time spacing between successive sampling pulses in the composite signal. Both of these approaches have the effect of reducing the amplitude of the skirt of the distorted pulse at the time that the next pulse is introduced into the loop. A further expedient employed in the prior art is to reshape each of the pulses 84 on each passage around the loop. This restores the distorted pulses 84 to an approximation on the rectangular pulse 82 prior to the addition of the new sample signal. As indicated above, I have discovered that the same or better results can be achieved in a simpler and more economical manner. In accordance with the present invention, the distortion of the waveform 92 is eliminated by supplying to gate 18 an activating signal 63 which has a leading edge 62 which occurs at the time of the trailing edge of pulse 57 or even slightly later in time. The function of gate 18 is shown in FIG. 6. Pulse 94 represents a pulse supplied by sample gate 28 to adder 22. Pulse 96 corresponds to the wave shape of the original pulse after one passage around the loop. The gate pulse signal supplied to gate 18 is shown at 63. Waveform 100 in FIG. 6 represents the signal passed by gate 18 to adder 22. It will be seen that the leading edge of the pulse 100 has been removed. Waveform 102 in FIG. 6 represents the addition of a second sample pulse similar to pulse 94 to the signal represented by waveform 100. As explained above, each new pulse is inserted in the time interval just preceding the emergence of the delayed signal from gate 18. Waveform 104 in FIG. 6 represents the signal 102 after one passage around the signal loop. Again gate 18 clips the leading edge of waveform 104 to produce the waveform shown at 106. It should be noted that the individual pulses are not reshaped. The reshaping occurs only at the leading edge of the composite signal circulating in the loop. This reshaping of the leading edge only of the composite signal results in a composite signal having approximately the idealized wave shape shown at 108 in FIG. 7. It should now be clear that gate 18 performs two functions. It forms the leading edge of the composite pulse as explained above and it removes sample pulses from the trailing edge of the composite pulse after they have made the desired number of passages around the loop. Thus the duration of the gate pulse 63 supplied to gate 18 of FIG. 1 is not greater than the time interval between the trailing edge of one sampling pulse 57 and the leading edge of the following sample pulse 57.

In considering the operation of the system of FIG. 1, it should be kept in mind that the composite signal of waveform G of FIG. 2 or waveform 108 of FIG. 7, have leading edges which correspond to the leading edges of sampling pulses 57. This may or may not coincide with the leading edges of the target echo pulses. This slight shift in apparent range of the target representation is generally of no consequence since accurate range data can be obtained from original pulses 54-56. Furthermore the shift in range from waveform A to waveform G is less than one pulse width of the radar system and hence is generally negligible in amount. The amplitude-modulation components 75 of FIG. 2G, which are superimposed on each composite pulse, may be processed by well-known means to recover information regarding the target velocity relative to the radar system. Mathematical analyses of the system of FIG. 1 have shown that for optimum results, the loop bandwidth should be flat out to the highest amplitude-modulation frequency of interest.

Only the basic elements of the signal loop have been shown in FIG. 1. In practice it will usually be necessary to provide additional amplifiers preceding delay line 12. Heterodyning circuits may be included in the series loop for changing the carrier frequency of various points in the signal loop. These techniques are employed in prior art sampled re-entrant data processing systems and in sweep integrators.

In the embodiment of FIG. 1 the total delay around the signal loop is greater than the pulse repetition period of the radar system by the delay time of delay line 16. It is possible to move delay line 16 to the timing loop so that it is in series with amplifier 34 and pick-off circuit 36. The delay around the signal loop will now be less than the pulse repetition period of the radar system by the delay time of delay line 16. The sampled pulses will now be collected in the reverse order in the signal loop. The gate pulse supplied to gate 18 will again be such that the oldest pulse and any portion of the signal which might overlap the next sample pulse is removed by gate 18.

While the invention has been described with reference to the preferred embodiment thereof, it will be apparent that various modifications and other embodiments thereof will occur to those skilled in the art within the scope of the invention. Accordingly I desire the scope of my invention to be limited only by the appended claims.

What is claimed is:

1. A re-entrant data processing system for processing pulse signals of a given time duration and interpulse period, said system comprising a closed signal loop having a signal propagation time around said loop which differs from said interpulse period by a small fraction of said interpulse period, said difference being at least equal to the time duration of said pulse signals, said loop including signal adder means having first and second inputs and a common output, said first input and said common output being connected in circuit with said closed loop, means for supplying the signals to be processed to said second input, and means in said loop for interrupting the application of signals to said first input during the time interval when signals are impressed on said second input.

2. A re-entrant data processing system comprising a closed signal loop having a finite signal propagation time around said loop, asid loop including signal adder means having first and second inputs and a common output, said first input and said common output being connected in circuit with said loop, a gate circuit coupled to said second input of said signal adder means, means for supplying signals to be processed to the input of said gate circuit, means coupled to said gate circuit for rendering said gate circuit operative to pass signals to said second input only at selected, regularly recurring time intervals, said time intervals being short compared to the signal propogation time of said loop, said signal propagation time of said closed signal loop being a nonintegral multiple of the recurrence period of said selected regularly recurring time intervals, and means in said loop for interrupting the application of signals to said first input of said signal adder means for said regularly recurring time intervals during which said gate circuit is operative.

3. A re-entrant data processing system comprising a closed signal loop having a finite signal propagation time around said loop, said loop including a first gate circuit and a signal adder means following said first gate circuit in said closed signal loop, said signal adder means having first and second inputs and a common output, said first input and said common output being connected in circuit with said closed signal loop, a second gate circuit coupled to said second input of said signal adder means, means for supplying signals to be processed to the input of said second gate circuit, means coupled to said second gate circuit for rendering said second gate circuit operative to pass signals to said second input only at selected, regularly recurring time intervals, said time intervals being short compared to the signal propagation time of said loop, said signal propagation time of said closed signal loop being a nonintegral multiple of the recurrence period of said selected, regularly recurring time intervals, and means coupled to said first gate circuit for rendering said first gate circuit inoperative to pass signals during said regularly recurring time intervals in which said second gate circuit is operative to pass signals.

4. A re-entrant data processing system comprising a closed signal loop having a finite signal propagation time S around said loop, said loop including a first gate circuit and a signal adder means, said signal adder means following said gate circuit in said closed signal loop, said signal adder means having first and second inputs and a common output, said first input and said common output being connected in circuit with said closed signal loop, a second gate circuit coupled to said second input of said signal adder means, means for supplying signals to be processed to said second gate circuit, means coupled to said second gate circuit for rendering said second gate circuit operative to pass signals to said second input only during time intervals of duration Y having a recurrence period R, where Y is not greater than S−NR, N being an integer, and means coupled to said first gate circuit for rendering said first gate circuit inoperative to pass signals for said intervals of duration Y during which said second gate circuit is operative to pass signals.

5. A re-entrant data processing system for processing signals having a repetition period P, said system comprising a closed signal loop having a finite signal propagation time S around said loop, where S is different than P, said loop including a first gate circuit and a signal adder means, said signal adder means following said first gate circuit in said loop, said signal adder means having first and second inputs and a common output, said first input and said common output being connected in circuit with said closed signal loop, a second gate circuit coupled to said second input of said signal adder means, means for supplying said signals to be processed to said second gate circuit, means coupled to said second gate circuit for rendering said second gate circuit operative to pass signals to said second input only during time intervals of duration Y, said intervals of duration Y having a recurrence period R, where $P=NR$, N being an integer, and Y is not greater than the difference betwen S and P, and means coupled to said first gate circuit for rendering said first gate circuit inoperative to pass signals for said time intervals of duration Y during which said second gate circuit is operative to pass signals.

6. A re-entrant data processing system for processing pulse type signals having a pulse duration W and a pulse repetition period P, said system comprising a closed signal loop having a finite signal propagation time S around said loop, where S is different than P, said loop including a first gate circuit and a signal adder means, said signal adder means following said first gate circuit in said loop, said signal adder means having first and second inputs and a common output, said first input and said common output being connected in circuit with said loop, a second gate circuit coupled to said second input of said signal adder means, means for supplying said pulse type signals to be processed to said second gate circuit, means coupled to said second gate circuit for rendering said second gate circuit operative to pass signals to said second input only during time intervals of duration Y having a recurrence period R, where P is equal to NR, N being an integer, and Y is not greater than the difference between S and P and is not greater than $WR/P$, and means coupled to said first gate circuit for rendering said first gate circuit inoperative to pass signals for said time intervals of duration Y during which said second gate circuit is operative to pass signals.

7. A re-entrant data processing system comprising a signal delay means having a delay time D, amplifier means, a first gate circuit, a signal adder means, and means coupling said above recited elements in a closed signal loop, said closed signal loop including means providing an additional signal delay time $d$, whereby the signal propagation time S around said closed loop is equal to $D+d$, said signal adder means having first and second inputs and a common output, said first input being coupled to the output of said first gate circuit, a second gate circuit coupled to said second input of said adder means, means for supplying signals to be processed to said second gate circuit, means coupled to said second gate circuit for rendering said gate circuit operative to pass signals to said second input of said adder means only during time intervals of duration Y, said intervals of duration Y having a recurrence period R, where $NR=D$, N being an integer, and Y is not greater than $d$, and means coupled to said first gate circuit for rendering said first gate circuit inoperative to pass signals for said time intervals of duration Y during which said second gate circut is operative to pass signals.

8. A re-entrant data processing system comprising a closed signal loop around which an introduced signal may pass a plurality of times, means coupled to said closed signal loop for intermittently introducing into said loop time spaced signals of finite duration, and gate means included in said loop and operative independently of said introduced signals to delete from said loop those portions of the signal circulating in said closed signal loop which occur in time coincidence with said introduced signals at the point of introduction of said introduced signals.

9. A re-entrant data processing system comprising a closed signal loop around which an introduced signal may pass a plurality of times, means coupled to said closed signal loop for intermittently introducing into said loop time spaced signals of finite duration, the time spacing betwen said time spaced signals differing from $mS$ by a small fraction of S, where $m$ is an integer and S is the signal propagation time around said loop, and gate means included in said loop and operative independently of said introduced signals to delete from said loop those portions of the signal circulating in said closed signal loop which occur in time coincidence with said introduced signals at the point of introduction of said introduced signals.

References Cited by the Examiner

UNITED STATES PATENTS

| | | | |
|---|---|---|---|
| 2,907,027 | 9/1959 | Uskavitch | 343—17.1 |
| 2,930,004 | 3/1960 | Coale | 343—17.1 |
| 3,039,691 | 6/1962 | Fleming et al. | 235—165 |

ROBERT C. BAILEY, *Primary Examiner.*

F. M. STRADER, C. L. JUSTUS, K. CLAFFY, MALCOLM A. MORRISON, *Examiners.*

T. D. JENNINGS, M. J. SPIVAK, *Assistant Examiners.*